US012371304B2

(12) United States Patent
Rasanen et al.

(10) Patent No.: US 12,371,304 B2
(45) Date of Patent: Jul. 29, 2025

(54) ELEVATOR ARRANGEMENT AND METHOD OF CONSTRUCTING ELEVATOR

(71) Applicant: Kone Corporation, Helsinki (FI)

(72) Inventors: Matti Rasanen, Helsinki (FI); Markku Haapaniemi, Helsinki (FI); Aki Haikonen, Helsinki (FI); Otto Lanz, Helsinki (FI); Janne Laine, Helsinki (FI); Sakari Korvenranta, Helsinki (FI); Jaakko Kahila, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/581,193

(22) Filed: Feb. 19, 2024

(65) Prior Publication Data

US 2024/0190682 A1 Jun. 13, 2024

Related U.S. Application Data

(63) Continuation of application No. PCT/EP2021/074558, filed on Sep. 7, 2021.

(51) Int. Cl.

*B66B 7/02* (2006.01)
*B66B 11/00* (2006.01)
*B66B 19/00* (2006.01)

(52) U.S. Cl.

CPC .......... *B66B 7/024* (2013.01); *B66B 11/0045* (2013.01); *B66B 19/002* (2013.01); *B66B 19/005* (2013.01)

(58) Field of Classification Search

CPC ..... B66B 7/024; B66B 7/023; B66B 11/0045; B66B 19/002; B66B 19/005

See application file for complete search history.

(56) References Cited

U.S. PATENT DOCUMENTS 5,899,300 A * 5/1999 Miller ..................... B66B 7/027 187/256
5,899,301 A * 5/1999 Aulanko ............. B66B 11/0045 187/254

(Continued)

FOREIGN PATENT DOCUMENTS

EP 3838828 A1 6/2021
EP 3872019 A1 9/2021

(Continued)

OTHER PUBLICATIONS

International Search Report and Written Opinion with International application No. PCT/EP2021/074558 dated May 18, 2022.

*Primary Examiner* — Anna M Momper
*Assistant Examiner* — Michelle M Mudwilder
(74) *Attorney, Agent, or Firm* — Harness, Dickey & Pierce, P.L.C.

(57) ABSTRACT

The invention relates to an elevator arrangement comprising an elevator shaft wall; and a guide rail line extending vertically at a distance from the shaft wall, the guide rail line being fixed to said wall with plurality of fixing brackets; and an elevator car vertically movable along at least said guide rail line; and a hoisting machine mounted at a first vertical level between the shaft wall and the guide rail line; and a hoisting roping movable with said hoisting machine, and connected to the elevator car; wherein the guide rail line extends in vertical direction past the hoisting machine the upper end of the guide rail line being higher than said hoisting machine, and said plurality of fixing brackets comprises one or more first fixing brackets higher than said hoisting machine, by which one or more first fixing brackets the portion of the guide rail line which portion is higher than said hoisting machine is fixed to the shaft wall; and wherein the hoisting machine comprising a motor and a rotatable drive wheel. The elevator arrangement comprises an elon- (Continued)

gated hoisting passage extending vertically between the shaft wall and the guide rail line inside which hoisting passage the hoisting machine fits to be hoisted, each said first fixing bracket being shaped to circumvent the hoisting passage. The invention also relates to a method of constructing an elevator.

17 Claims, 4 Drawing Sheets

(56) References Cited

U.S. PATENT DOCUMENTS 6,247,557 B1 * 6/2001 Kobayashi ............ B66B 11/008 187/254
6,446,762 B1 * 9/2002 St. Pierre ................ B66B 7/024 187/408
6,848,543 B2 * 2/2005 Adifon .................... B66B 7/021 187/254
6,991,069 B1 * 1/2006 Ach .................... B66B 11/0045 187/254
7,025,177 B1 * 4/2006 Yang ....................... B66B 7/027 187/254
9,309,092 B2 * 4/2016 Tenhunen ........... B66B 11/0045
9,676,596 B2 * 6/2017 Yoshikawa ........... B66B 19/007
10,384,912 B2 * 8/2019 Watanabe ................. B66B 7/02
10,745,246 B2 * 8/2020 Fonteneau .............. B66B 7/022
2002/0005320 A1 1/2002 Nakagaki et al.
2002/0108815 A1 * 8/2002 Mustalahti .......... B66B 11/0045 187/254
2012/0145489 A1 * 6/2012 Tian .................... B66B 11/0045 187/406
2020/0039790 A1 * 2/2020 Shimabayashi ......... B66B 11/08
2023/0020453 A1 * 1/2023 Medeiros ................ B66B 19/00

FOREIGN PATENT DOCUMENTS

WO WO-0015535 A1 * 3/2000 ......... B66B 11/0045
WO WO-0104036 A1 * 1/2001 ......... B66B 11/0045
WO WO-2005056457 A1 * 6/2005 ......... B66B 11/0045
WO WO-2010065038 A1 * 6/2010 ......... B66B 11/0045

* cited by examiner

ELEVATOR ARRANGEMENT AND METHOD OF CONSTRUCTING ELEVATOR

CROSS-REFERENCE TO RELATED APPLICATION

This application is a continuation of PCT International Application No. PCT/EP2021/074558 which has an International filing date of Sep. 7, 2021, the entire contents of which are incorporated herein by reference.

FIELD OF THE INVENTION

The invention relates to an elevator arrangement and a method of constructing an elevator. The elevator is preferably an elevator for transporting passengers and/or goods.

BACKGROUND OF THE INVENTION

In connection with so-called jump-lifts, the bottom part of an elevator shaft is taken into use before the building has been completed. In this case the upper parts of the building as well as the top part of the elevator shaft can be constructed at the same time as an elevator moving in the bottom part of the elevator shaft already serves people on the lower floors of the building under construction. In a jump-lift the elevator car moving in the lower parts of the elevator shaft is suspended and moved during construction-time use with a hoisting machine mounted in the shaft. When the elevator shaft under construction above the hoisting machine has reached a sufficient stage of completion, the completed part of the elevator shaft can be taken into use. At this stage a "jump" is performed, wherein the hoisting machine is hoisted higher. Thereafter, the car can reach a higher position than before the jump and start to serve additional floors.

It is known that the hoisting machine can be mounted in the shaft in various ways, such as via a machine room which is vertically movable in the elevator shaft. The machine room can be mountable in different vertical positions e.g. by releasable mounting means. When a jump is to be made, the hoisting machine can be hoisted together with the machine room resting supported by it. Alternatively, the hoisting machine can be mounted in the shaft without a machine room, in which case it can be mounted for example on one or more guide rails or a guide rail bracket or practically on any suitable bearing structure provided in or fixed on the shaft. When a jump is to be made, the hoisting machine can be hoisted to be mounted to a higher position. In prior art, this has been done by placing the hoisting machine to be carried by a working platform, and then hoisting the working platform upwards. The hoisting roping is either replaced with a longer one or pulled also to said higher position.

A drawback of prior solutions has been that they have not provided a simple solution for layouts where the hoisting machine is between a guide rail line and a shaft wall on the back side of the guide rail line, i.e. on opposite side of the guide rail line than the side on which the car is movable.

BRIEF DESCRIPTION OF THE INVENTION

The object of the invention is to introduce an improved elevator arrangement and a method of constructing an elevator. An object is particularly to introduce a solution whereby one or more of the above defined problems of prior art and/or drawbacks discussed or implied elsewhere in the description can be alleviated. An object is particularly to introduce a solution which facilitates simply performing a jump wherein a machineroomless elevator arrangement is transformed such that the hoisting machine thereof is in a new higher position thereby facilitating change of the elevator car hoisting range to extend higher than before.

Embodiments are introduced where hoisting of the hoisting machine can be performed simply and swiftly.

Embodiments are introduced where hoisting of the hoisting machine can be performed simply and swiftly with small amount of unnecessary shifts of the hoisting machine.

Embodiments are introduced where hoisting of the hoisting machine can be performed such that car guidance in lower parts of the hoistway is firm, the structures subsequent a jump process being rigid and space efficient.

Embodiments are introduced where hoisting machine can be positioned such during construction time that it is optimal yet without making slow or difficult to convert the construction time elevator arrangement into a final machineroomless elevator.

Embodiments are introduced where the position of the hoisting roping can be efficiently repositioned in the method.

It is brought forward a new elevator arrangement comprising an elevator shaft wall; and a guide rail line extending vertically at a distance from the shaft wall, the guide rail line being fixed to said wall with plurality of fixing brackets; and an elevator car vertically movable along at least said guide rail line; and a hoisting machine mounted at a first vertical level between the shaft wall and the guide rail line; and a hoisting roping movable with said hoisting machine, and connected to the elevator car; wherein the guide rail line extends in vertical direction past the hoisting machine the upper end of the guide rail line being higher than said hoisting machine, and said plurality of fixing brackets comprises one or more first fixing brackets higher than said hoisting machine, by which one or more first fixing brackets the portion of the guide rail line which portion is higher than said hoisting machine is fixed to the elevator shaft wall, wherein the hoisting machine comprises a motor and a rotatable drive wheel. The elevator arrangement comprises an elongated hoisting passage extending vertically between the shaft wall and the guide rail line inside which hoisting passage the hoisting machine fits to be hoisted, each said first fixing bracket being shaped to circumvent the hoisting passage.

With this kind of solution one or more of the above mentioned objects and/or advantages can be achieved.

Preferable further details of the arrangement are introduced in the following, which further details can be combined with the arrangement individually or in any combination.

In a preferred embodiment, wherein the vertical projection of the hoisting machine fits inside the hoisting passage throughout the height of the hoisting passage.

In a preferred embodiment, the arrangement comprises an elevator shaft delimited by the shaft wall.

In a preferred embodiment, the hoistway wall comprises a planar vertical face delimiting the elevator shaft on which said plurality of fixing brackets are fixed or plurality of vertical planar faces delimiting the elevator shaft on which plurality of vertical planar faces said plurality of fixing brackets are fixed.

In a preferred embodiment, said plurality of fixing brackets comprises one or more second fixing brackets lower than said hoisting machine, by which one or more first fixing brackets the portion of the guide rail line which portion is lower than said hoisting machine is fixed to the shaft wall; and the vertical projection of each said second fixing bracket overlaps with the vertical projection of the hoisting passage.

In a preferred embodiment, the second fixing brackets form a blockage for the hoisting passage and the hoisting passage does not extend below the uppermost one of the second fixing brackets.

In a preferred embodiment, each said second fixing bracket comprises a first fixing base portion against which the guide rail line is fixed, and a second fixing base portion fixed against the elevator shaft wall, and an arm, which arm connects the first and second fixing base portion, the arm extending along the centerline of the guide rail line from the from the first fixing base portion to the second first fixing base portion, wherein the centerline is a line orthogonal to the shaft wall and passing via geometric center of the guide rail line.

In a preferred embodiment, the height of the hoisting passage is at least 2 meters, preferably more than 3 meters.

In a preferred embodiment, the vertically elongated hoisting passage extends vertically between the shaft wall and the guide rail line above the first vertical level.

In a preferred embodiment, the vertically elongated hoisting passage extends in vertical direction past each said first fixing bracket, each said first fixing bracket being outside the hoisting passage. In particular, each said first fixing bracket is within the height of the hoisting passage.

In a preferred embodiment, the arrangement comprises a hoisting arrangement for hoisting the hoisting machine inside the hoisting passage to a second vertical level, which is higher, preferably at least 2 meters, preferably more than 3 meters higher, than said first vertical level.

In a preferred embodiment, the hoisting arrangement comprises a flexible hoisting member, such as a rope, belt, chain or equivalent, connectable with the hoisting machine and vertically movable in the hoisting passage.

In a preferred embodiment, the hoisting arrangement comprises an engaging member, such as hook or a gripper or equivalent hanging from the flexible hoisting member by which the flexible hoisting member is connectable with the hoisting machine.

In a preferred embodiment, the hoisting arrangement comprises a driving device for moving the hoisting member inside the hoisting passage. The driving device is preferably mounted in the elevator shaft higher than the first level.

In a preferred embodiment, the hoisting passage is a space void of brackets or other rigid members mounted rigidly on the guide rail line or the shaft wall.

In a preferred embodiment, the hoisting passage is wider than the machinery and thicker than the machinery throughout the height of the hoisting passage.

In a preferred embodiment, each said first bracket comprises a first fixing base portion against which the guide rail line is fixed, and a second fixing base portion fixed against the elevator shaft wall, and a curved arm, which curved arm connects the first and second fixing base portion.

In a preferred embodiment, the curved arm comprises a first arm portion fixedly connected to the first fixing base portion and extending horizontally from the first fixing base in width direction of the hoisting wall and a second arm portion fixedly connected to the second fixing base portion and extending from the second fixing base portion outwards from the hoisting wall beside the hoisting passage.

In a preferred embodiment, the first fixing bracket delimits the hoisting passage on only one side in width direction of the shaft.

In a preferred embodiment, at least half of the width of the passage fits between the second arm portion and centerline of the guide rail line wherein the centerline is a line orthogonal to the shaft wall and passing via geometric center of the guide rail line.

In a preferred embodiment, the hoisting machine is mounted at said first vertical level between the shaft wall and the guide rail line on the guide rail line, preferably with releasable fixing means. Preferably, the releasable fixing means comprise bolts extending through a part of the guide rail line.

In a preferred embodiment, the guide rail line comprises plurality of guide rail sections aligned on top of each other.

In a preferred embodiment, the hoisting machine is mounted at said first vertical level between the shaft wall and the guide rail line on the guide rail line such that the guide rail line carries the whole weight of the hoisting machine.

In a preferred embodiment, the elevator car is suspended by the hoisting roping. Preferably, the elevator moreover comprises a counterweight suspended by the hoisting roping.

In a preferred embodiment, said hoisting roping comprises one or more ropes.

In a preferred embodiment, the roping passes around the drive wheel.

In a preferred embodiment, the hoisting roping is arranged in 2:1 configuration to suspend said car and a counterweight, in particular on opposite sides of the drive wheel.

In a preferred embodiment, the roping passes from a rope terminal to counterweight, around one or more rope wheels thereof, to hoisting machine, around the drive wheel thereof and to the car, around one or more rope wheels thereof, and to a releasable rope clamp, via which it passes to a rope supply storage, such as to one or more rope reels.

In a preferred embodiment, the first level is substantially higher than the pit floor of the hoistway, preferably more than 6 meters, more preferably more than 10 meters, higher than the pit floor of the hoistway. Thus, the hoisting machine is mounted high and the solution suits well for facilitating constructing an elevator with high mounted hoisting machine.

In a preferred embodiment, the hoisting machine comprises a mounting pedestal via which it can be mounted and/or via which it is mounted on the guide rail line.

In a preferred embodiment, the arrangement comprises an elevator control configured to control the hoisting machine, in particular rotation of a motor of the hoisting machine, in response to signals received from one or more user interfaces, for thereby controlling movement of the car in response to signals received from one or more user interfaces.

In a preferred embodiment, the elevator car is on opposite side of the guide rail line than the hoisting machine.

In a preferred embodiment, the guide rail line is a guide rail for guiding movement of the elevator car, the elevator car preferably comprising a guide, such as a roller guide or a sliding guide, supported horizontally on the guide rail line.

It is brought forward a new method of constructing an elevator comprising

- providing an elevator arrangement as defined in any of the preceding claims; and
- demounting the hoisting machine mounted at the first vertical level between the shaft wall and the guide rail line; and
- hoisting the hoisting machine inside the hoisting passage to a second vertical level, which is higher, preferably at least 2 meters, preferably more than 3 meters higher, than said first vertical level; and mounting the hoisting machine at the second vertical level between the shaft wall and the guide rail line.

With this kind of solution one or more of the above mentioned objects and/or advantages can be achieved.

Preferable further details of the method are introduced in the following, which further details can be combined with the method individually or in any combination. Preferable further details of the arrangement provided in the method have been introduced earlier above, which further details can be combined with the method individually or in any combination.

In a preferred embodiment, the method comprises after said mounting the hoisting machine at the second vertical level between the shaft wall and the guide rail line moving (second moving) the elevator car in the elevator shaft with the hoisting machine while it is mounted at the second vertical level between the shaft wall and the guide rail line.

In a preferred embodiment, the method comprises before said demounting, moving (first moving) the elevator car in the elevator shaft with the hoisting machine while it is mounted at the first vertical level between the shaft wall and the guide rail line.

In a preferred embodiment, the method, in particular said hoisting the hoisting machine, comprises pulling hoisting roping upwards together with the hoisting machine.

In a preferred embodiment, the method comprises during said hoisting the hoisting machine supplying hoisting roping from rope supply storage, such as from one or more rope reels.

In a preferred embodiment, the roping passes via at least one releasable rope clamp to a rope supply storage, such as to one or more rope reels.

In a preferred embodiment, the method comprises before said hoisting the hoisting machine opening the releasable rope clamp.

In a preferred embodiment, the method comprises after said hoisting the hoisting machine closing the releasable rope clamp.

In a preferred embodiment, each said moving comprises controlling by an elevator control the hoisting machine, in particular rotation of a motor of the hoisting machine, in response to signals received from one or more user interfaces, for thereby controlling movement of the car in response to signals received from one or more user interfaces.

In a preferred embodiment, the first fixing bracket delimits the hoisting passage on only one side in width direction of the shaft.

In a preferred embodiment, at least half of the width of the passage fits between the second arm portion and centerline of the guide rail line wherein the centerline is a line orthogonal to the shaft wall and passing via geometric center of the guide rail line.

In a preferred embodiment, the method comprises during said first moving performing construction work above the level L1 and/or during said second moving performing construction work above the level L2. This construction work may comprise installing components into the shaft S and/or constructing the shaft S itself to extend higher. Said installing may comprise for example installing additional guide rail line sections on top of one or more existing guide rail lines of the arrangement to make these one or more guide rail lines extend higher.

In a preferred embodiment, the method comprises after said hoisting the hoisting machine inside the hoisting passage to a second vertical level, which is higher than said first vertical level, replacing the first fixing brackets, which are between said first and second vertical level with one or more second fixing brackets which are different than said first fixing brackets, wherein preferably the vertical projection of each said second fixing bracket overlaps with the vertical projection of the hoisting passage.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
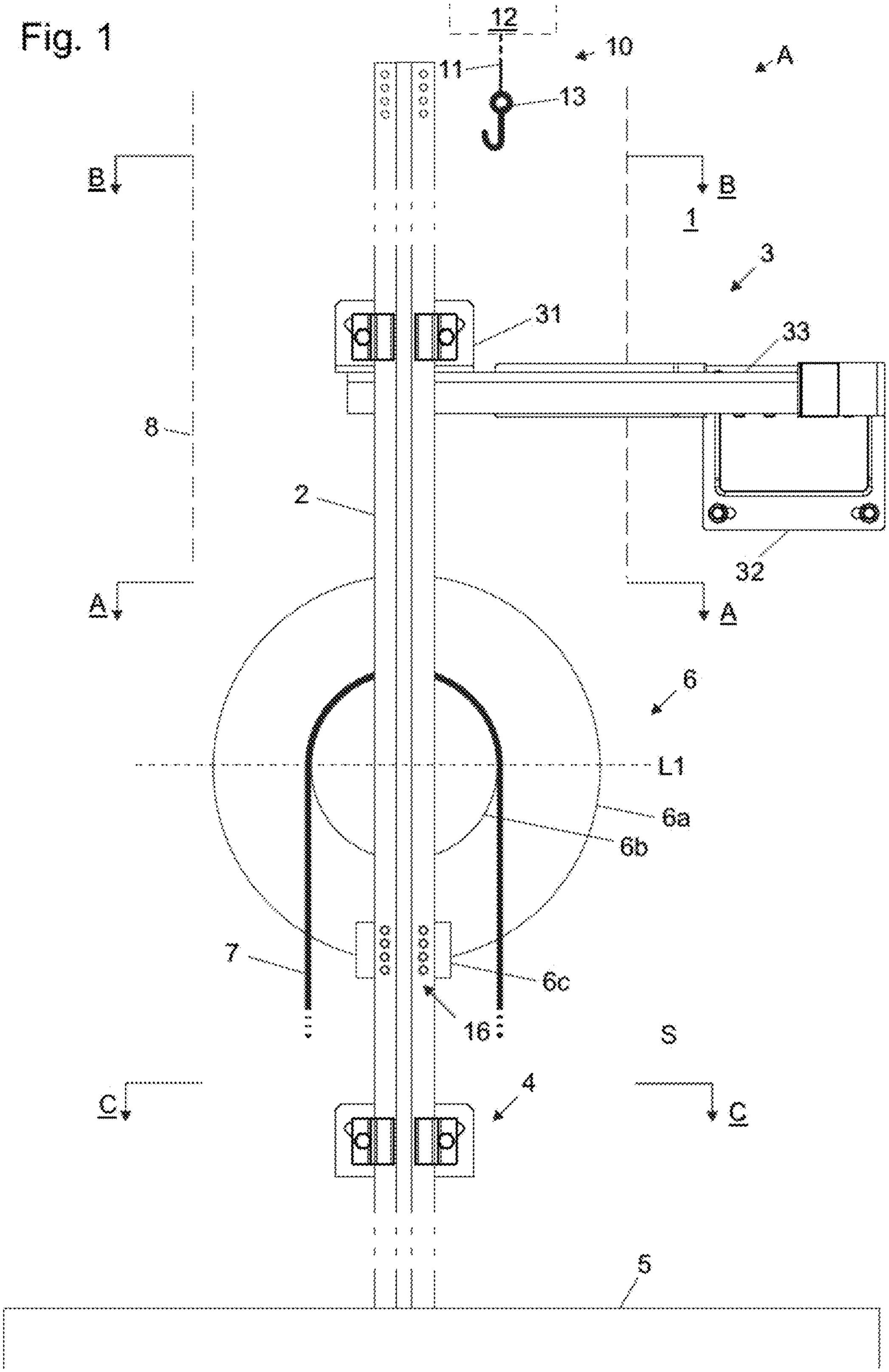
FIG. 1 illustrates schematically and partially a front view of an elevator arrangement in a phase of a method for constructing an elevator according to an embodiment.

FIG. 1 illustrates an elevator arrangement A according to an embodiment of the invention in a phase of a method for constructing an elevator according to an embodiment of the invention.

The elevator arrangement A comprises an elevator shaft and an elevator shaft wall 1; and a guide rail line 2 extending vertically at a distance from the shaft wall 1, the guide rail line 2 being fixed to said wall 1 with plurality of fixing brackets 3,4; and an elevator car 5 vertically movable along at least said guide rail line 2; and a hoisting machine 6 mounted at a first vertical level between the shaft wall 1 and the guide rail line 2; and a hoisting roping 7 movable with said hoisting machine 6, and connected to the elevator car 5. The hoisting machine 6 comprises a motor **6*a* and a rotatable drive wheel 6*b*. The hoisting machine 6 preferably also comprises a mounting pedestal 6*c* via which it can be mounted. The guide rail line 2 extends in vertical direction past the hoisting machine 6 the upper end of the guide rail line 2 being higher than said hoisting machine 6. Thus, the arrangement A can be transformed such that the car 5 thereof can be hoisted to reach a new higher position guided by the guide rail line 2. Said plurality of fixing brackets 3,4 comprises one or more first fixing brackets 3 higher than said hoisting machine 6, by which one or more first fixing brackets 3 the portion of the guide rail line 2 which portion is higher than said hoisting machine 6 is fixed to the shaft wall 1. The one or more brackets 3** ensure that the portion fixed by them is rigid enough to start serving the car guiding function.

The elevator car 5 is on opposite side of the guide rail line 2 than the hoisting machine 6. In the embodiment of FIG. 1, the guide rail line 2 is a guide rail for guiding movement of the elevator car 5, the elevator car 5 preferably comprising a guide (not shown), such as a roller guide or a sliding guide, supported horizontally on the guide rail line 2.

The elevator arrangement A comprises an elongated hoisting passage 8 extending vertically between the shaft wall 1 and the guide rail line 2 inside which hoisting passage 8 the hoisting machine 6 fits to be hoisted, each said first fixing bracket 3 being shaped to circumvent the hoisting passage 8. The vertically elongated hoisting passage 8 particularly extends vertically between the shaft wall (1) and the guide rail line 2 above the first vertical level L1. The hoisting passage 8 provides that the hoisting machine 6 can be hoisted inside the hoisting passage 8 to a second vertical level L2, which is higher than said first vertical level L1. This hoisting can be performed simply and swiftly, in particular without considerable lateral shift of the hoisting machine 6 or the roping 7 as well as without collision risk caused by the brackets 3 which fix the portion of the guide rail line 2 is higher than said hoisting machine 6 is fixed to the shaft wall 1.

Figure 3:
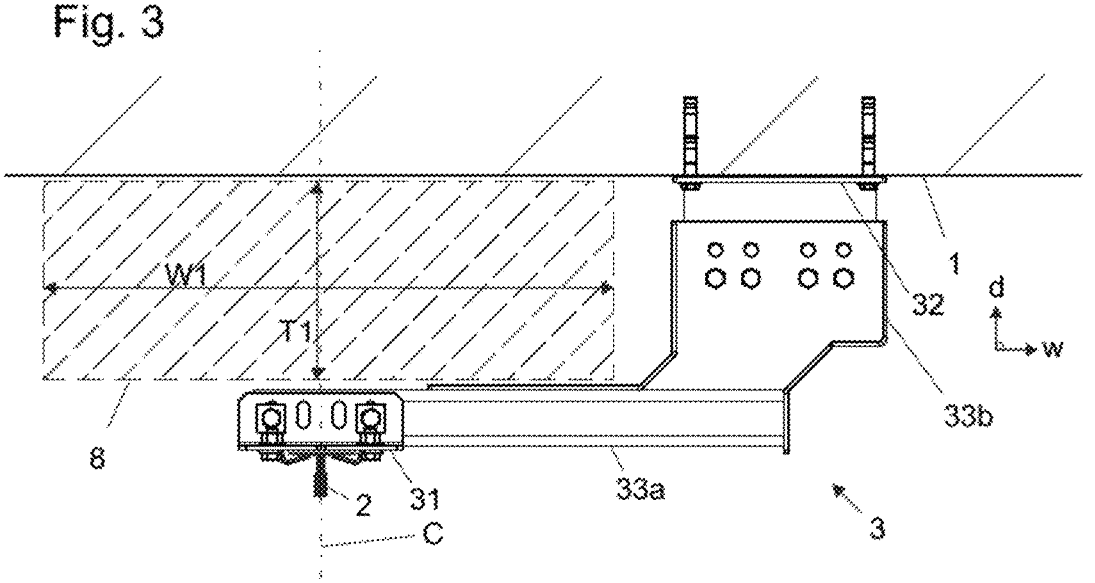
FIG. 3 illustrates cross section B-B of FIG. 1.
Figure 9:
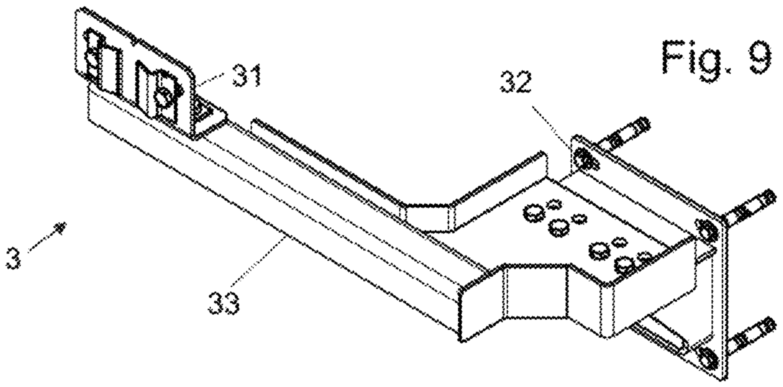
FIG. 9 illustrates as a perspective view preferred further details of the first fixing bracket of FIG. 1.

Preferred structure of the first fixing bracket 3 is illustrated in FIGS. 1, 3 and 9. The structure of the each said first fixing bracket 3 is preferably such that it comprises a first fixing base portion 31 against which the guide rail line 2 is fixed, and a second fixing base portion 32 fixed against the elevator shaft wall 1, and a curved arm 33, which curved arm 33 connects the first and second fixing base portion 31,32.

The curved arm 33 preferably comprises a first arm portion 33*a* fixedly connected to the first fixing base portion 31 and extending horizontally from the first fixing base 31 in width direction w of the shaft wall 1 and a second arm portion 33*b* fixedly connected to the second fixing base portion 32 and extending from the second fixing base portion 32 outwards from the hoisting wall 1 beside the hoisting passage 8. The arm portions 33*a* and 33*b* are fixedly connected. The arm portions together preferably together form a shape of letter L, as illustrated.

Figure 4:
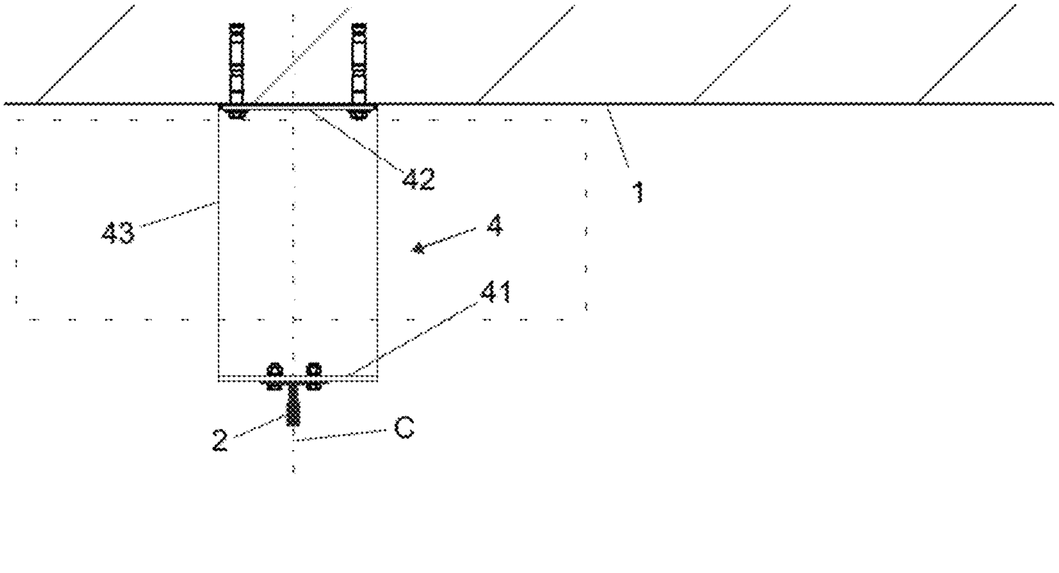
FIG. 4 illustrates cross section C-C of FIG. 1.

Said plurality of fixing brackets 3,4 comprises one or more second fixing brackets 4 lower than said hoisting machine 6, by which one or more first fixing brackets 4 the portion of the guide rail line 2 which portion is lower than said hoisting machine 6 is fixed to the shaft wall 1. The structure of the second brackets 4 can be selected relatively freely. These second brackets 4 may similar as the first fixing brackets 4, but they can be different. Then they are preferably optimized for permanent use, because they need not circumvent the hoisting passage 8 as it is the case with the first brackets. This is because in hoisting of the hoisting machine 6 it does not need to circumvent the second fixing brackets 4. Thus, the vertical projection of each said second fixing bracket 4 may overlap with the vertical projection of the hoisting passage 8, as it is the case in the embodiment illustrated by FIGS. 1-4. This structure suits well for the permanent use, because it is compact and simple to be constructed rigid. The vertically elongated hoisting passage 8 extends in vertical direction past each said first fixing bracket 3, each said first fixing bracket 3 being outside the hoisting passage 8. In particular, each said first fixing bracket 3 is within the height of the hoisting passage 8. Therefore, it is advantageous for the hoisting operation that the said first fixing bracket 3 circumvents it. The vertical projection of the hoisting passage 8 is illustrated in FIG. 4 to show where the hoisting passage 8 is positioned relative to the second fixing brackets 4 but in broken line and without hatching, because the hoisting passage 8 is actually higher than the second fixing brackets 4. In the embodiment of FIGS. 1-4, the second fixing brackets 4 form a blockage for the hoisting passage, and the hoisting passage 8 does not extend below the uppermost one of the second fixing brackets 4.

Preferred structure of the second fixing bracket 4 is illustrated in FIGS. 1 and 4. The structure of the each said second fixing bracket 4 is preferably such that it comprises a first fixing base portion 41 against which the guide rail line 2 is fixed, and a second fixing base portion 42 fixed against the elevator shaft wall 1, and an arm 43, which arm 43 connects the first and second fixing base portion 41,42, the arm 43 extending along the centerline C of the guide rail line 2 from the from the first fixing base portion 41 to the second first fixing base portion 42, wherein the centerline C is orthogonal to the shaft wall W and passes via geometric center of the guide rail line 2.

Hereinafter, preferred details of the hoisting passage 8 are described. The vertical projection of the hoisting machine 6 fits inside the hoisting passage 8 throughout the height of the hoisting passage 8. The height of the hoisting passage 8 is preferably at least 2 meters, preferably more than 3 meters. The hoisting passage 8 is a space void of brackets or other rigid members mounted rigidly on the guide rail line 2 or the shaft wall 1. The hoisting passage 8 is wider than the machinery 6 and thicker than the machinery 6 throughout the height of the hoisting passage 8. The width W of the hoisting passage 8 and the width W2 of the machinery 6 are measured in depth direction d of the shaft and the thickness T of the hoisting passage 8 and the thickness T2 of the machinery 6 are measured in width direction w of the shaft wall 1, i.e. in horizontal direction parallel to the shaft wall 1.

For facilitating hoisting of the hoisting machine 6 between the shaft wall 1 and the guide rail line 2 without first performing considerable shifts in width direction w of the shaft wall 1, preferably at least half of the width W1 of the passage 8 fits between the second arm portion 33*b* and centerline C of the guide rail line 2, wherein the centerline C is a line orthogonal to the shaft wall W and passes via geometric center of the guide rail line 2.

For facilitating the hoisting of the hoisting machine 6 upwards, the arrangement A comprises a hoisting arrangement 10 for hoisting the hoisting machine 6 inside the hoisting passage 8 to a second vertical level, which is higher, preferably at least 2 meters, preferably more than 3 meters higher, than said first vertical level. As illustrated in FIG. 1, the hoisting arrangement 10 comprises a flexible hoisting member 11, such as a rope, belt, chain or equivalent, connectable with the hoisting machine 6 and vertically movable in the hoisting passage 8. For facilitating said connectability, the hoisting arrangement 10 preferably comprises an engaging member 13, such as hook or a gripper or equivalent hanging from the flexible hoisting member 11 by which the flexible hoisting member 11 is connectable with the hoisting machine 6. The engaging member 13 is suitable for engaging the hoisting machine 6 or a component such as a lifting eye fixed to the hoisting machine 6. The hoisting arrangement 10 is suitable for carrying the hoisting machine via the flexible hoisting member 11 and the engaging member 13. The hoisting arrangement 10 moreover comprises a driving device 12. The driving device is in particular suitable for moving the flexible hoisting member 11 and/or the engaging member 13 inside the hoisting passage 8. The driving device preferably comprises an electric motor and one or more drive members rotatable by the motor for driving the flexible hoisting member 11. The one or more drive members can be for instance a drive wheel or a drive sprocket.

As illustrated in FIGS. 1, 3 and 9, the first fixing bracket 3 may delimit the hoisting passage 8 on only one side in width direction of the shaft, wherein the width referred to is width w in FIG. 3, i.e. the horizontal direction parallel to the shaft wall 1. This is advantageous because hereby space consumed from the elevator shaft is saved, and the first fixing bracket has more space and freedom to be moved out of its position to be replaced by a different bracket 4.

Figure 2:
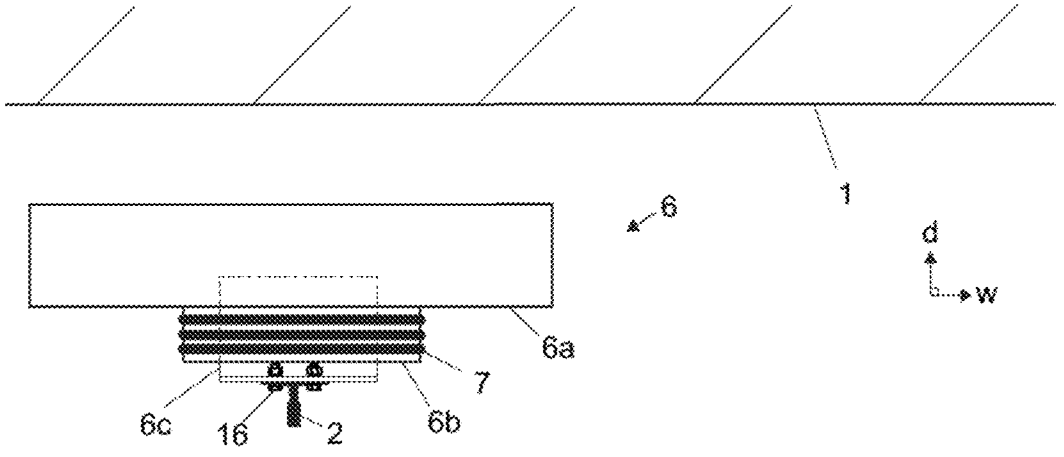
FIG. 2 illustrates cross section A-A of FIG. 1.

Preferably, the hoisting machine 6 is mounted at said first vertical level L1 between the shaft wall 1 and the guide rail line 2 on the guide rail line 2, as illustrated in FIGS. 1 and 2. Particularly, it is preferable that the hoisting machine 6 is mounted at said first vertical level L1 between the shaft wall 1 and the guide rail line 2 on the guide rail line 2 with releasable fixing means 16. Preferably, the releasable fixing means 16 comprise bolts extending through a part of the guide rail line 2.

Preferably, the hoisting machine 6 is mounted at said first vertical level between the shaft wall 1 and the guide rail line 2 on the guide rail line 2 such that the guide rail line 2 carries the whole weight of the hoisting machine 6. Thus, remounting the hoisting machine at a higher vertical level is relatively well independent on other structures than the guide rail line 2.

Preferably, the guide rail line 2 comprises plurality of guide rail sections aligned on top of each other vertically. Thus, the length thereof is simple to extend. the guide rail line 2 preferably has T shaped cross sectional profile.

Figure 6:
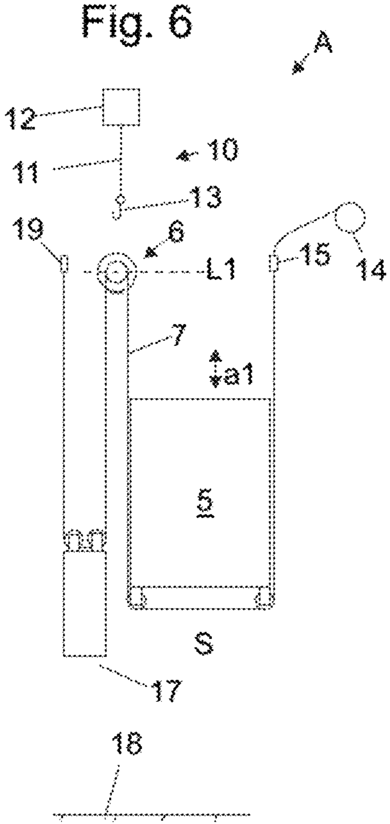
FIG. 6 illustrates preferred further details of the hoisting arrangement of FIG. 1 and a phase of a method for constructing an elevator according to an embodiment.

FIG. 6 illustrates preferred further details of the hoisting arrangement A. In this case, the elevator car 5 is suspended by the hoisting roping 7. The elevator moreover comprises a counterweight 17 suspended by the hoisting roping 7. The hoisting roping 7 is arranged in 2:1 configuration to suspend said car 5 and counterweight 17. This is preferable, however not necessary since other alternative ratios could be utilized. In the embodiment of FIG. 6, the roping 7 passes from a rope terminal 16 to counterweight 17, around one or more rope wheels thereof, to hoisting machine 6, around the drive wheel thereof and to the car 5, around one or more rope wheels thereof, and to a releasable rope clamp 15, via which it passes to a rope supply storage 14, such as to one or more rope reels 14.

The arrangement A preferably moreover comprises an elevator control configured to control the hoisting machine 6, in particular rotation of the motor 6*a* of the hoisting machine 6, in response to signals received from one or more user interfaces, for thereby controlling movement of the car 5.

Figure 10:
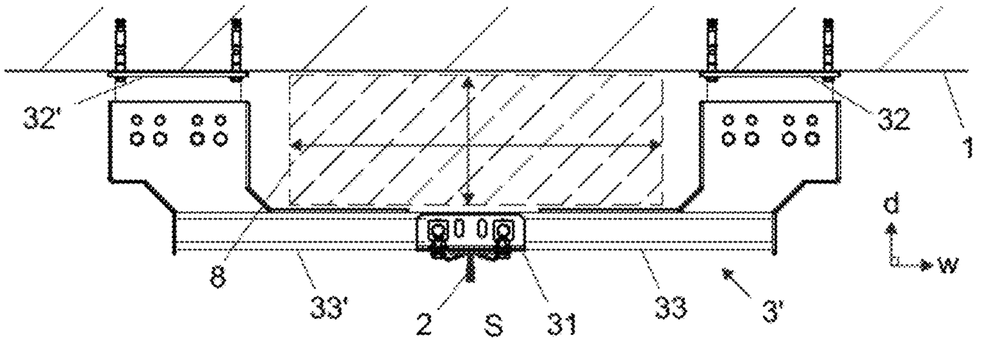
FIG. 10 illustrates an alternative structure for the first fixing bracket of FIG. 1, as well as how the cross section B-B would be when utilizing the alternative structure of the first fixing bracket.

As illustrated in FIGS. 1, 3 and 9, the first fixing bracket 3 may delimit the hoisting passage 8 on only one side in width w direction of the shaft S. However, this is not necessary. In the alternative embodiment of FIG. 10, the first fixing bracket 3' delimits the hoisting passage 8 on two opposite sides in width direction w of the shaft S, wherein the width referred to is width w in FIG. 3, i.e. the horizontal direction parallel to the shaft wall 1. This is may be advantageous, because the first fixing bracket 3' is thus very rigid providing thus simply a firm fixing for the guide rail line 2. In the embodiment illustrated in FIG. 10, the first fixing bracket 3' comprises a first fixing base portion 31 against which the guide rail line 2 is fixed, and a second fixing base portion 32 fixed against the elevator shaft wall 1, and a curved arm 33, which curved arm 33 connects the first and second fixing base portion 31,32. These features are as described referring to embodiment illustrated in FIG. 1. In the first fixing bracket 3' of the embodiment of FIG. 10 moreover comprises a third fixing base portion 32' fixed against the elevator shaft wall 1, and a second curved arm 33', which second curved arm 33' connects the first and third fixing base portion 31,32'. In this embodiment, the hoisting passage 8 extends between the curved arm 33 and the second curved arm 33'. More specifically, the curved arm 33 comprises a first arm portion 33*a* fixedly connected to the first fixing base portion 31 and extending horizontally from the first fixing base 31 in width direction of the shaft wall 1 and a second arm portion 33*b* fixedly connected to the first fixing base portion 31 and extending from the second fixing base portion 32 outwards from the hoisting wall 1 beside the hoisting passage 8. The second curved arm 33' comprises a second first arm portion 33*a'* fixedly connected to the first fixing base portion 31 and extending horizontally to an opposite direction than the first arm portion 33*a* from the first fixing base 31 in width direction of the hoisting wall 1, and a second second arm portion 33*b'* fixedly connected to the third fixing base portion 32' and extending from the third fixing base portion 32' outwards from the hoisting wall 1 beside the hoisting passage 8.

The method according to an embodiment, comprises providing an elevator arrangement A as described referring to FIG. 1. FIG. 6 illustrates preferred further details of the arrangement A at this stage of the method.

The method further comprises after said providing, demounting the hoisting machine 6 mounted at the first vertical level between the shaft wall 1 and the guide rail line 2. This step preferably comprises opening releasable fixing means 16, in particular fixing means with which the hoisting machine 6 is mounted at said first vertical level L1 between the shaft wall 1 and the guide rail line 2 on the guide rail line 2.

Figure 5:
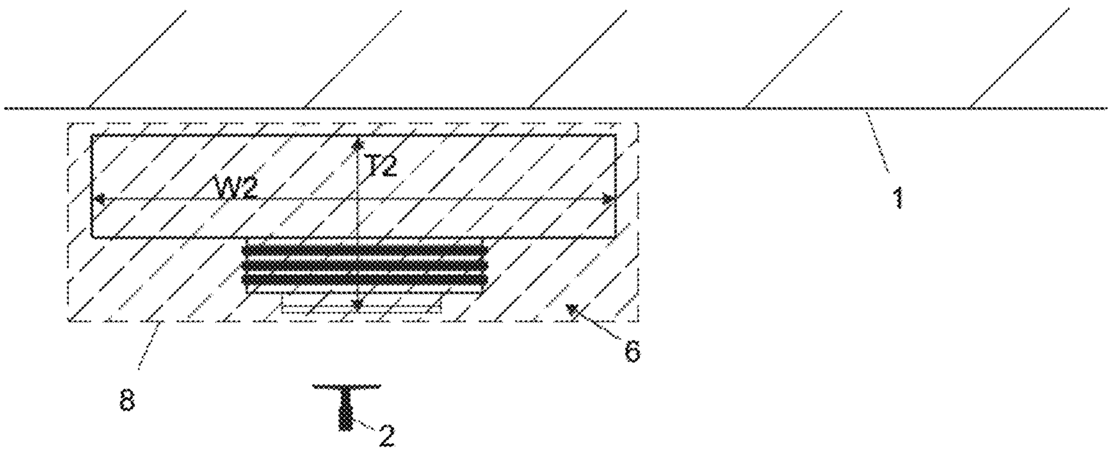
FIG. 5 illustrates how the cross section A-A of FIG. 1 will look when the hoisting machine is shifted to be inside the hoisting passage in a step of the method according to an embodiment.

The method may further comprise after said demounting shifting the hoisting machine 6 to be inside the hoisting passage 8. This may require only slight shift or this shift may even be unnecessary. FIG. 5 illustrates the hoisting machine positioned to be inside the hoisting passage 8.

Figure 7:
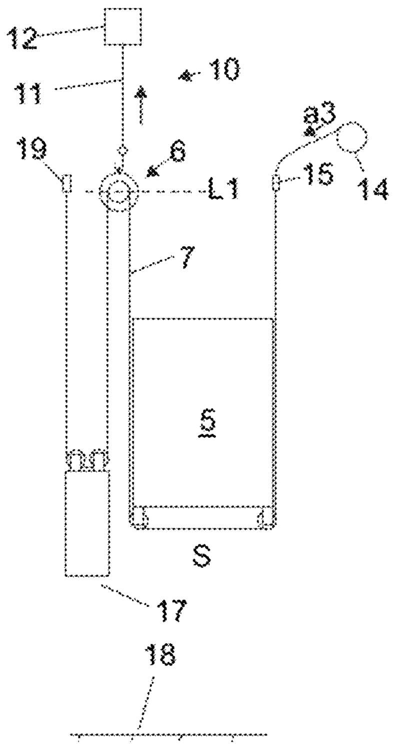
FIG. 7 illustrates a phase of a method for constructing an elevator according to an embodiment following the phase of FIG. 6.

The method further comprises after said demounting, and said shifting if needed, hoisting the hoisting machine 6 inside the hoisting passage 8 to a second vertical level L2, which is higher, preferably at least 2 meters, preferably more than 3 meters higher, than said first vertical level. FIG. 7 illustrates hoisting of the hoisting machine 6 inside the hoisting passage 8.

The demounting preferably comprises connecting a flexible hoisting member 11 of a hoisting arrangement 10 to the hoisting device 6 and exerting upwards directed force on the hoisting device 6 with the hoisting arrangement 10. Thus, the demounting and subsequent steps can be performed aided by the hoisting arrangement 10.

Figure 8:
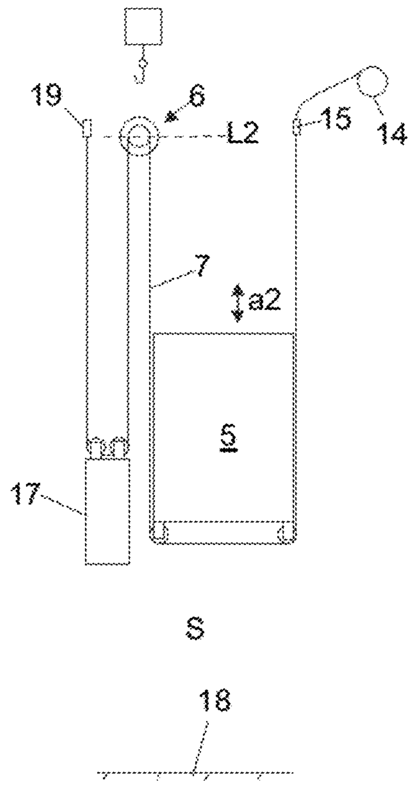
FIG. 8 illustrates a phase of a method for constructing an elevator according to an embodiment following the phase of FIG. 7.

The method further comprises after said hoisting the hoisting machine 6 inside the hoisting passage 8 to a second vertical level L2 mounting the hoisting machine 6 at the second vertical level L2 between the shaft wall 1 and the guide rail line 2. FIG. 8 illustrates the hoisting machine 6 mounted at said second vertical level L2. The step of mounting the hoisting machine 6 at the second vertical level L2 between the shaft wall 1 and the guide rail line 2 preferably comprises mounting the hoisting machine 6 in a similar manner as it was mounted at said first vertical level L1. Thus, in this mounting, the hoisting machine 6 is preferably mounted at the second vertical level L2 as illustrated in FIGS. 1 and 2.

As illustrated by arrow a1 in FIG. 6, the method preferably comprises before said demounting, moving (also referred to as first moving) the elevator car 5 in the elevator shaft S with the hoisting machine 6 while it is mounted at the first vertical level L1 between the shaft wall 1 and the guide rail line 2. Thus, the elevator car 5 is used for transporting passengers and/or goods.

As illustrated by arrow a2 in FIG. 8, the method preferably comprises after said mounting the hoisting machine 6 at the second vertical level L2 between the shaft wall 1 and the guide rail line 2, moving (also referred to as second moving) the elevator car 5 in the elevator shaft S with the hoisting machine 6 while it is mounted at the second vertical level between the shaft wall 1 and the guide rail line 2. Thus, the elevator car 5 is used for transporting passengers and/or goods subsequent to the vertical position change of the hoisting machine 6. This makes possible that the car 5 can move to a higher position than before.

As illustrated in FIG. 8, the method preferably comprises pulling hoisting roping 7 upwards together with the hoisting machine 6.

As illustrated in FIG. 8 by arrow a3, the method comprises during said hoisting the hoisting machine 6 supplying hoisting roping 7 from rope supply storage 14, such as from one or more rope reels.

As illustrated in FIGS. 6-8, the roping 7 preferably passes via at least one releasable rope clamp 15 to a rope supply storage 14, such as to one or more rope reels. Preferably, the method comprises before said hoisting the hoisting machine 6 inside the hoisting passage 8 to a second vertical level L2 opening the releasable rope clamp 15. Moreover, the method preferably comprises after said hoisting the hoisting machine 6 inside the hoisting passage 8 to a second vertical level L2 closing the releasable rope clamp 15.

Preferably, said first moving or said second moving or each of these comprises controlling by an elevator control the hoisting machine 6, in particular rotation of a motor 6*a* of the hoisting machine 6, in response to signals received from one or more user interfaces, for thereby controlling movement of the car 5 in response to signals received from one or more user interfaces. The one or more user interfaces can comprise for example:

- one or more button panels mounted in proximity of the elevator shaft or inside the car 5 and/or
- one or more portable devices such as mobile phones and/or
- one or more and/or one or more touch screens mounted in proximity of the elevator shaft or inside the car 5.

Preferably, the method comprises during said first moving performing construction work above the level L1 and/or during said second moving performing construction work above the level L2. This work may comprise installing components into the shaft S and/or constructing the shaft S itself to extend higher. Said installing may comprise for example installing additional guide rail line sections on top of one or more existing guide rail lines of the arrangement to make these one or more guide rail lines extend higher.

Preferably, the method comprises after said hoisting the hoisting machine 6 inside the hoisting passage 8 to a second vertical level L2, which is higher than said first vertical level L1, replacing first fixing brackets 3, which are between said first vertical level L1 and said second vertical level L2 with one or more second fixing brackets 4, which are different than said first fixing brackets, wherein preferably the vertical projection of each said second fixing bracket 4 overlaps with the vertical projection of the hoisting passage 8. The view at the point of cross section B-B of FIG. 1 will then preferably become modified to be as illustrated in FIG. 4.

The shaft wall 1 is a vertical wall delimiting an elevator shaft, which is in particular a space inside which an elevator car can be fitted. The shaft wall may in a first kind of embodiment have a vertical planar face by which it delimits the shaft, which is the case when the shaft wall is constructed as a concrete wall. Said plurality of fixing brackets 3,4 are then fixed on said planar face. The concrete wall is preferably formed without discontinuities. The shaft wall may in a second alternative kind of embodiment have apertures, which is the case for instance if the shaft wall is constructed as beam wall comprising plurality of beams each having a planar face by which it delimits the shaft. The shaft wall then comprises plurality of vertical planar faces delimiting the elevator shaft. Said plurality of fixing brackets 3,4 are then fixed on said plurality of vertical planar faces.

Generally preferably, the first level L1 is substantially higher than the pit floor 18 of the hoistway S, preferably more than 6 meters, more preferably more than 10 meters, higher than the pit floor 18 of the hoistway S.

The vertical level at which the hoisting machine 6 is positioned, is regarded to be defined by the position of the weight centre of the hoisting machine. Thus, when the hoisting machine 6 is at the first vertical level L1, the weight center thereof is located at the first vertical level and when the hoisting machine 6 is at the second vertical level L2, the weight center thereof is located at the second vertical level.

Preferably, during hoisting the hoisting machine 6, the car 5 and/or counterweight 17 are not suspended by the roping 7. This can be achieved if the car and/or counterweight 17 is/are suspended otherwise the time of said hoisting, such as locked immovably into a position in the hoistway or lowered to rest on buffers.

As mentioned, preferably said hoisting the hoisting machine 6 comprises pulling the hoisting roping (7) upwards together with the hoisting machine 6. This is however not necessary, since the roping 7 could alternatively be hoisted separately from the hoisting machine 6. This could be implemented for example such that prior to said demounting the hoisting arrangement 10 is provided with a rope lifting tool (not showed) hanging from the flexible hoisting member 11. Then, before said demounting the rope lifting tool the roping 7 is engaged by the rope lifting tool and pulled upwards. The, the roping is locked to the higher position and the hoisting machine is hoisted otherwise as described referring to FIGS. 5 and 7 but the roping 7 being already hoisted beforehand.

Generally, the elevator arrangement can comprise also additional guide rail lines in addition to the guide rail line 2, which are not shown in Figures, such as for counterweight guide rail line(s) and/or additional guide rail line(s) for guiding the elevator car 5.

In the preferred embodiments generally, the elongated hoisting passage 8 in particular extends vertically between the shaft wall 1 and the guide rail line 2 more specifically such that the centerline C of the guide rail line 2 extends across the hoisting passage 8, wherein the centerline C is a line orthogonal to the shaft wall W and passing via geometric center of the guide rail line 2.

In the preferred embodiments generally, the hoisting machine 6 is in particular mounted at the first vertical level L1 between the shaft wall 1 and the guide rail line 2 more specifically such that the centerline C of the guide rail line 2 extends across the hoisting machine 6, wherein the centerline C is a line orthogonal to the shaft wall W and passing via geometric center of the guide rail line 2.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. An elevator arrangement comprising:

an elevator shaft wall; and a guide rail line extending vertically at a distance from the shaft wall, the guide rail line being fixed to said shaft wall with plurality of fixing brackets; and an elevator car vertically movable along at least said guide rail line in an elevator car passage;

a hoisting machine mounted at a first vertical level directly between the shaft wall and the guide rail line;

a hoisting roping movable with said hoisting machine, and connected to the elevator car;

wherein the guide rail line extends in vertical direction past the hoisting machine, an upper end of the guide rail line being higher than said hoisting machine, and said plurality of fixing brackets comprises one or more first fixing brackets higher than said hoisting machine, by which the one or more first fixing brackets on a portion of the guide rail line in which the portion is higher than said hoisting machine is fixed to the shaft wall, wherein the hoisting machine comprises a motor and a rotatable drive wheel, and wherein the elevator shaft wall, the guide rail line, and the one or more first fixing brackets define a hoisting passage extending vertically between the shaft wall and the guide rail line, inside the hoisting passage the hoisting machine fits to be hoisted, each said first fixing bracket being shaped to circumvent the hoisting passage while being between the hoisting passage and the elevator car passage.

2. An elevator arrangement according to claim 1, wherein a vertical projection of the hoisting machine fits inside the hoisting passage throughout a height of the hoisting passage.

3. An elevator arrangement according to claim 1, wherein said plurality of fixing brackets comprises one or more second fixing brackets lower than said hoisting machine, by which one or more second fixing brackets the portion of the guide rail line which portion is lower than said hoisting machine is fixed to the shaft wall; and a vertical projection of each said second fixing bracket overlaps with a vertical projection of the hoisting passage, and each said second fixing bracket comprises a first fixing base portion against which the guide rail line is fixed, and a second fixing base portion fixed against the elevator shaft wall, and an arm, which arm connects the first and second fixing base portions.

4. An elevator arrangement according to claim 3, wherein the one or more second fixing brackets are separated from a floor of the elevator shaft.

5. An elevator arrangement according to claim 1, wherein the vertically elongated hoisting passage extends vertically between the shaft wall and the guide rail line above the first vertical level.

6. An elevator arrangement according to claim 1, wherein the arrangement comprises a hoisting arrangement for hoisting the hoisting machine inside the hoisting passage to a second vertical level, which is higher by at least 2 meters than said first vertical level.

7. An elevator arrangement according to claim 1, wherein the hoisting passage is a space void of brackets or other rigid members mounted rigidly on the guide rail line or the shaft wall.

8. An elevator arrangement according to claim 1, wherein each said first fixing bracket comprises a first fixing base portion against which the guide rail line is fixed, and a second fixing base portion fixed against the elevator shaft wall, and a curved arm, which curved arm connects the first and second fixing base portions.

9. An elevator arrangement according to claim 8, wherein the curved arm comprises a first arm portion fixedly connected to the first fixing base portion and extending horizontally from the first fixing base in width direction of the shaft wall and a second arm portion fixedly connected to the second fixing base portion and extending from the second fixing base portion outwards from a hoisting wall beside the hoisting passage.

10. An elevator arrangement according to claim 1, wherein the vertically elongated hoisting passage extends in vertical direction past each said first fixing bracket, each said first fixing bracket being outside the hoisting passage, each said first fixing bracket particularly being within a height of the hoisting passage.

11. An elevator arrangement according to claim 1, wherein the first fixing bracket delimits the hoisting passage on only one side in width direction of the shaft, and/or wherein at least half of the width of the passage fits between a second arm portion and centerline of the guide rail line, wherein the centerline is a line orthogonal to the shaft wall and passing via geometric center of the guide rail line, and/or wherein the hoisting machine is mounted at said first vertical level between the shaft wall and the guide rail line on the guide rail line, and/or wherein the hoisting machine comprises a mounting pedestal via which it can be mounted and/or via which it is mounted on the guide rail line, and/or wherein the arrangement comprises an elevator control configured to control the hoisting machine, including rotation of a motor of the hoisting machine, in response to signals received from one or more user interfaces, for thereby controlling movement of the car in response to signals received from the one or more user interfaces.

12. An elevator arrangement according to claim 11, wherein, based on the hoisting machine being mounted at said first vertical level between the shaft wall and the guide rail line on the guide rail line, the hoisting machine being releasably mounted.

13. A method of constructing an elevator comprising providing an elevator arrangement as defined in claim 1; and demounting the hoisting machine mounted at the first vertical level between the shaft wall and the guide rail line; and hoisting the hoisting machine inside the hoisting passage to a second vertical level, which is higher than said first vertical level; and mounting the hoisting machine at the second vertical level between the shaft wall and the guide rail line.

14. A method according to claim 13, wherein the method comprises after said mounting the hoisting machine at the second vertical level between the shaft wall and the guide rail line moving (second moving) the elevator car in the elevator shaft with the hoisting machine while it is mounted at the second vertical level between the shaft wall and the guide rail line.

15. A method according to claim 13, wherein the method comprises before said demounting moving (first moving) the elevator car in the elevator shaft with the hoisting machine while it is mounted at the first vertical level between the shaft wall and the guide rail line.

16. A method according to claim 13, wherein the method, in particular said hoisting the hoisting machine, comprises pulling the hoisting roping upwards together with the hoisting machine, and/or wherein the method comprises during said hoisting the hoisting machine supplying hoisting roping from rope supply storage, such as from one or more rope reels.

17. A method according to claim 13, wherein said first and/or second moving comprises controlling by an elevator control the hoisting machine, in particular rotation of a motor of the hoisting machine, in response to signals received from one or more user interfaces, for thereby controlling movement of the car in response to signals received from the one or more user interfaces, and/or wherein the method comprises during said first moving performing construction work above a first level and/or during said second moving performing construction work above a second level, and/or wherein the method comprises after said hoisting the hoisting machine inside the hoisting passage to a second vertical level, which is higher than said first vertical level, replacing first fixing brackets, which are between said first vertical level and said second vertical level with one or more second fixing brackets, which are different than said first fixing brackets, wherein a vertical projection of each said second fixing bracket overlaps with a vertical projection of the hoisting passage.

* * * * *